United States Patent Office 3,542,643
Patented Nov. 24, 1970

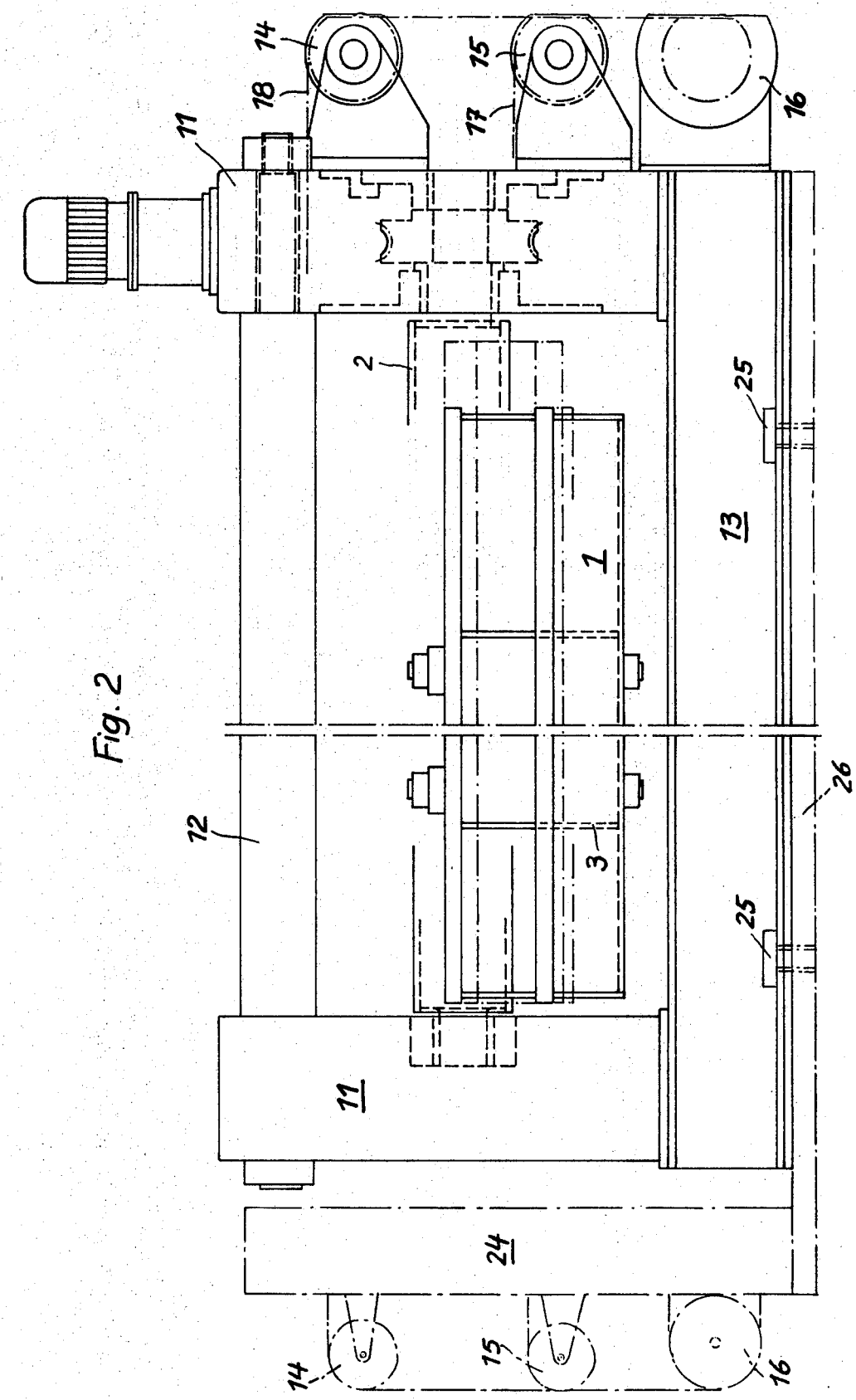

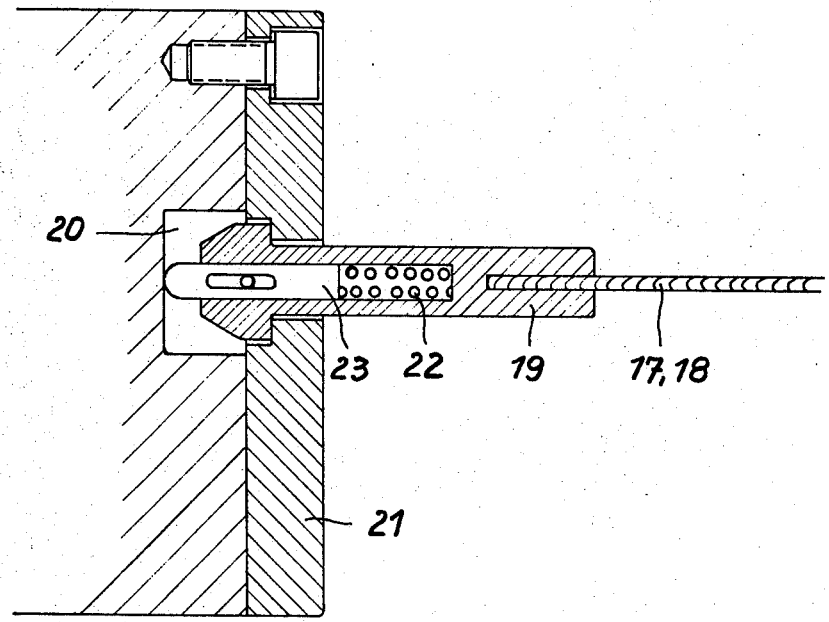

3,542,643
TRANSVERSE DIVIDING SHEARS FOR METAL PLATES
Josef Schiffers, Monchengladbach-Rheindahlen, Germany, assignor to Schloemann Aktiengesellschaft, Dusseldorf, Germany, a German company
Filed May 8, 1968, Ser. No. 727,642
Claims priority, application Germany, May 11, 1967, Sch 40,690
Int. Cl. B26d 7/26
U.S. Cl. 83—698
4 Claims

ABSTRACT OF THE DISCLOSURE

A transverse dividing shear for metal plates and sheets, comprising: upper and lower cutter blocks, each consisting of a filler bar and a blade beam, slidably guided in upper and lower shear saddles, and being preferably actuated by cables wound upon cable drums, and a rotatable receiving body, corresponding in length and in longitudinal direction with the shear blade, the shear and the rotatable receiving body both being formed with receiving ducts, to be brought into alignment with one another, preferably with funnel-shaped entrance apertures, for the cutter blocks.

---

This invention relates to a transverse dividing shear for metal sheets, particularly thick metal plates, in which cutter blocks consisting of filler bars and cutting blades are inserted in upper and lower shear saddles by means of longitudinal guides, and can be pushed out in the longitudinal direction of the shear.

Such transverse dividing shears, as is known, must have a length of blade corresponding to the breadth of the plate to be subdivided. With shear lengths of from 3 to 4 metres, therefore, the cutter blocks may weigh up to one ton, so that considerable difficulties are already experienced in the dismantling of the used blades and the mounting of freshly ground blades, which are inevitable owing to the increasing wear of the blades. The connecting of the actual cutting blades with the filling pieces to form cutter blocks has already led to a considerable saving of time, because the preparation in advance in this way could be effected in separate workshops. It is therefore only still necessary to employ, for the changing, the cutter block, correctly dimensioned in advance by the use of packing pieces for example. Since however the usual connections between cutter block and shear saddle take up too much time to produce, the filling pieces are preferably provided with dovetail guides, and are run into the shear saddles in the longitudinal direction. For this purpose it is known to use auxiliary lifting appliances, such as cranes, with which, however, the accurate adjusting of the cutter block, into a position from which it can be pushed into the shear saddle, still takes up a great deal of time. There is also, in the operation of changing the cutter blocks, a considerable risk of accidents.

The object of the invention is to provide a transverse dividing shear of the kind hereinbefore described, in such a way that the disadvantages mentioned are obviated. In particular, the changing of the cutter blocks in a very short time is rendered possible, with a reduction in the risk of accidents. This is substantially attained, according to the invention, by the fact that on one side of the shear is arranged a rotatable receiving body, extending in the longitudinal direction of the blades, of a longitudinal extent corresponding to the blade length, this receiving body being provided with at least two pairs of receiving ducts for the cutter blocks, and being brought into at least two adjusted positions, one pair of receiving ducts always being in a position flush with the receiving ducts of the shear. In this way it is possible to use the rotatable receiving body, in one of its angular positions, for accommodating those cutter blocks the cutting blades of which have become unusable in the course of operation and are run out of the shear. In order to secure the cutter blocks lodged in the receiving body in this way, quick-change devices known in themselves may be employed. After the cutter blocks have been located in the receiving body, the latter is rotated so far that two previously prepared cutter blocks are located in two other receiving ducts in the receiving device, in a position flush with the receiving ducts of the shear saddles. Thereupon the previously prepared cutter blocks that are ready for insertion may be run into the shear, whilst the unusable cutter blocks located in the receiving device pass to the overhauling position.

In order to facilitate the running of the cutter blocks in and out, a cable drum is preferably provided on each side of the shear, and also two reversing or deflecting rollers, designed for cables attached to the upper and lower cutter blocks individually.

The assembling and dismantling of the cutter blocks can in this way be effected fully mechanically, whilst operating handles are required only for the securing of the cutter blocks. In this way not only are the changing times considerably shortened, but at the same time the risk of accidents is materially reduced.

The running in and out of the cutter blocks may alternatively be effected by means of a rack-and-pinion drive. In this case each cutter block would be provided with a toothed rack extending over its entire length. In the blade saddles and in the receiving device, correspondingly arranged driven pinions would be provided, with which the cutter blocks would be displaced.

This or a similar displacement drive, for instance a friction-wheel drive, or even a pneumatic or hydraulic stepwise drive, is simpler in operation, but more expensive to manufacture, than the transport by cable drum and deflecting rollers.

The invention will now be further described, with reference to the accompanying drawings, which illustrate some embodiments by way of example, and in which:

FIG. 2 is a side view of the receiving body according to the invention; and

FIG. 3 shows an advantageous method of securing the ends of the cable to the cutter blocks.

Figure 1:
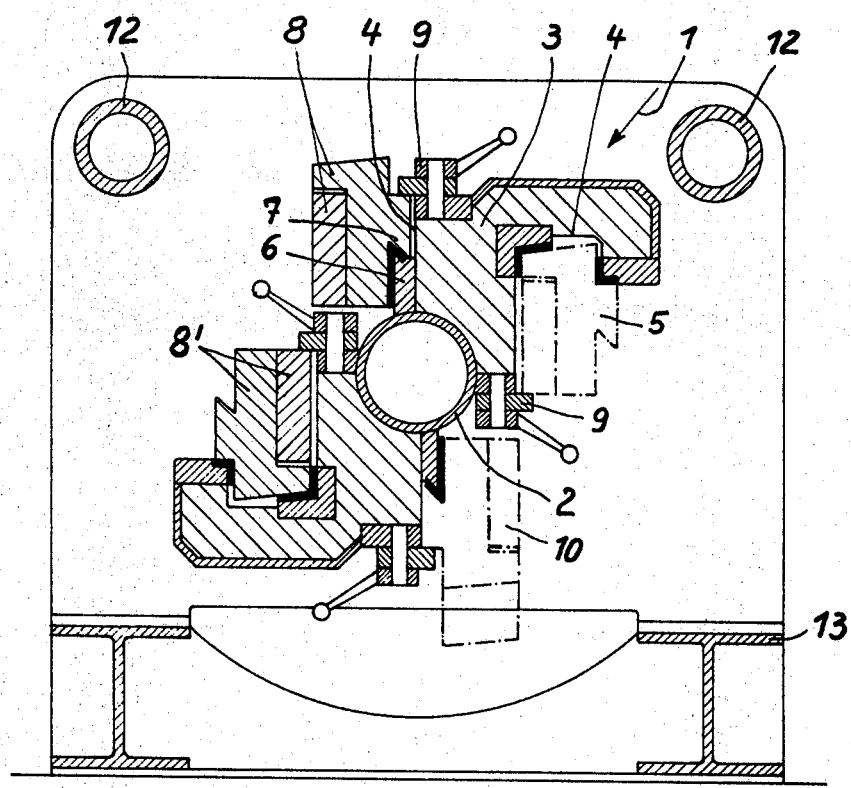
FIG. 1 shows a receiving body according to the invention in cross-section.

As FIG. 1 shows, a rotatable receiving body 1 is a rotary cross, constructed in cross-section in the manner of a turn-stile or spider. Holding elements 3 are here welded to a rotatable shaft 2, and these holding elements in their turn form the receiving ducts 4 for the cutter blocks, each consisting of a blade beam and a filler bar. These receiving ducts are located on both sides of the holding elements 3. They have funnel-shaped apertures, as indicated by inclined lines in FIG. 1, and they partly embrace on one side the lower cutter block 5, which is represented by dot-and-dash lines, whilst on the other side they possess dovetail-shaped lugs 6, in which the dovetail wedge or key 7 of the upper cutter block 8 can take up its position, jamming being effected by means of a quick-change device 9. For this special kind of arrangement it is essential that the particular pair of cutter blocks inserted in the receiving ducts should be located in flush position or alignment with the recesses, which are provided in a part of the shears, not illustrated here, for the accommodation of the cutter blocks. The cutter blocks 8 and 8' therefore have the same position, relatively to one another, in the receiving device as they have in the shear. In the position illustrated, the pair of cutter blocks 8 and 8' is located in the position from which it is run into the shear. The pair of cutter blocks 5 and 10, drawn in dot-and-dash lines, was run out of the shear first, and has been brought into the position illustrated by rotating the receiving device.

FIG. 2 shows the rotatable receiving device in side elevation. The hollow shaft 2 is rotatable in bearing blocks 11 at the ends. For stiffening, the bearing blocks are clamped to one another by supports 12 arranged between them. The bearing on the shear side is preferably lodged in a wall-like housing, in which window-like gaps, not shown, may be provided for the passage of the cutter blocks. The upper part of the receiving device, shown to the rear in the drawing, on grounds of clearness, is not shown or only partly shown with broken lines.

The front section of the rotary cross is drawn with full lines. The holding elements 3 are arranged as partition plates at regular distances apart, distributed over the length of the rotary cross. On the bottom girder 13 of the frame there may also be provided releasable securing means, such as adjusting screws or studs 25, which enable the receiving device to be fitted, in case of need, to a member 26 of the shear. The receiving device may alternatively be constructed for travelling upon rails, so that the cutter blocks to be changed can be carried directly into a workshop.

Deflecting rollers 14 and 15 and cable drums 16 are provided at both ends of the shear. Those at the left-hand end are shown mounted upon a member 24 of the shear. Upon the drums 16, two cables 17 and 18 can be wound, of which the cable 17 passes round the rollers 15 and the cable 18 round the rollers 14.

By their free ends the cables 17 and 18 are attached to the lower cutter block 8' and to the upper cutter block 8 respectively. For this purpose, as shown in FIG. 3, they enter at the ends into hollow bolts 19, which are inserted into corresponding apertures 20 in front plates 21 on the filler bars of the cutter blocks. The cables are secured in the front portion of the hollow bolts 19. In the rear portion of each of the bolts 19 is located a compression spring 22, which bears against the front end of a pin 23, which is displaceable in the hollow shank of the bolt 19, and which in its turn bears against the bottom or inner end of the aperture or recess 20, and therefore tends to hold the bolt head always in contact with the front plate 21. Any accidental release of the cables from the cutter blocks is thus obviated. On the other hand the connection can be released by displacing the bolt 19, and at the same time compressing the spring 22, and then drawing the bolt out sideways.

The flush alignment of the receiving ducts 4 provided in the receiving device upon the shear requires special care. It is for this reason that the parts of the receiving device 1 provided for the reception of the cutter blocks is mounted on a member 28 of the shear with adjusting screws 25, shown in FIG. 2 of the drawing. As already mentioned it is an advantage if the receiving ducts are so constructed that their entrance apertures facing the shear are somewhat funnel-shaped. For the same reason, such a funnel-like construction of the entrance apertures is also advantageous in the cutter block carriers of the shear.

I claim:

1. A transverse dividing shear for metal plates and sheets, comprising: upper and lower shear saddles, upper and lower cutter blocks, each cutter block consisting of a filler bar and blade beam, and being inserted in the upper and lower shear saddles respectively by means of longitudinal guides, and being adapted to be slid out of the shear saddles in the longitudinal direction of the shear, and a rotatable body, of a length corresponding to the length of the shear blade, and extending in the longitudinal direction of the said blade, the shear being formed with receiving ducts for the cutter blocks, and the receiving body being formed with at least two pairs of receiving ducts for the cutter blocks, and being adapted to be brought into at least two adjusted positions, in each of which one pair of its receiving ducts is always located in flush alignment with receiving ducts of the shear.

2. A transverse dividing shear as claimed in claim 1, further comprising: two cable drums, one on each side of the shear, and four deflecting rollers, two on each side of the shear, and two cables one releasably attached to each of the two cutter blocks, and both being wound on a cable drum.

3. A transverse dividing shear as claimed in claim 1, the cable ducts in the rotatable receiving body and in the cutter block carriers of the shear being formed with funnel-shaped entrance apertures.

4. A transverse dividing shear as claimed in claim 1, further comprising: a frame, bearings mounted on the frame, the rotatable receiving body being journalled in these bearings, and adjusting screws for establishing flush alignment of the receiving ducts provided in the receiving device with those of the shear.

References Cited

UNITED STATES PATENTS

| | | | |
|---|---|---|---|
| 3,371,515 | 3/1968 | Munschauer | 83—563 X |
| 3,405,581 | 10/1968 | Krynytzky | 83—563 |
| 3,452,632 | 7/1969 | Brolund | 83—698 X |

FRANK T. YOST, Primary Examiner

U.S. Cl. X.R.

83—563, 926